United States Patent
Ikeda et al.

(10) Patent No.: US 7,475,418 B2
(45) Date of Patent: Jan. 6, 2009

(54) DIGITAL BROADCASTING SYSTEM AND METHOD FOR AUTOMATICALLY LOCATING PROGRAMS AFTER RELOCATION

(75) Inventors: Tamotsu Ikeda, Tokyo (JP); Shinji Negishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1269 days.

(21) Appl. No.: 10/089,282

(22) PCT Filed: Jul. 30, 2001

(86) PCT No.: PCT/JP01/06550

§ 371 (c)(1),
(2), (4) Date: Mar. 26, 2002

(87) PCT Pub. No.: WO02/11328

PCT Pub. Date: Feb. 7, 2002

(65) Prior Publication Data

US 2002/0166128 A1 Nov. 7, 2002

(30) Foreign Application Priority Data

Jul. 28, 2000 (JP) .............................. 2000-228251
Aug. 9, 2000 (JP) .............................. 2000-241789

(51) Int. Cl.
- H04N 7/20 (2006.01)
- H04B 7/00 (2006.01)
- H04B 1/18 (2006.01)
- H04B 1/10 (2006.01)
- H03K 9/00 (2006.01)
- H03D 1/04 (2006.01)
- G06F 15/16 (2006.01)

(52) U.S. Cl. ............... 725/70; 455/512; 455/166.2; 455/297; 375/316; 375/346; 709/231

(58) Field of Classification Search .............. 725/70; 455/512, 166.2, 297; 375/316, 346; 709/231
See application file for complete search history.

(56) References Cited

U.S. PATENT DOCUMENTS 6,611,695 B1 * 8/2003 Periyalwar .............. 455/562.1

FOREIGN PATENT DOCUMENTS

JP 5-90908 4/1993

(Continued)

OTHER PUBLICATIONS

DVB Project, Specification for Service Information (SI) in Digital Video Broadcasting (DVB) Systems, Mar. 1998, DVB Project Office.*

(Continued)

Primary Examiner—Hoang-Vu A Nguyen-Ba
(74) Attorney, Agent, or Firm—Finnegan, Henderson, Farabow, Garrett & Dunner, L.L.P.

(57) ABSTRACT

A broadcasting station transmits a program of continuous sequence of events as a transport stream so as to be received by at least a mobile receiver. The broadcasting station provides the transport stream with link information showing the links between the transport stream it transmits in its own service area and the programs being transmitted in adjacent service areas. With this arrangement, the mobile receiver can receive the program it is receiving continuously in an adjacent service area by referring to the link information if it moves from the original service area into the adjacent service area.

21 Claims, 9 Drawing Sheets

FOREIGN PATENT DOCUMENTS

| | | |
|---|---|---|
| JP | 05-090908 A  * | 4/1993 |
| JP | 5-90909 | 4/1993 |
| JP | 8-191249 | 7/1996 |
| JP | 8-307215 | 11/1996 |
| JP | 9-162821 | 6/1997 |
| JP | 10-4366 | 1/1998 |
| JP | 10-150345 | 6/1998 |
| JP | 10-209817 | 8/1998 |
| JP | 11-68598 | 3/1999 |
| JP | 11-234154 | 8/1999 |
| JP | EP 0961430 | 12/1999 |
| JP | EP 1024614 | 8/2000 |
| JP | 2001-168684 | 6/2001 |
| JP | 2001-169195 | 6/2001 |

OTHER PUBLICATIONS

Rohde & Schwarz, Measurements on MPEG2 and DVB-T Signals (!), Mar. 2000, News from Rohde & Schwarz, No. 168.*

* cited by examiner

| DATA STRUCTURE | NUMBER OF BITS | INDICATES OF BIT COLUMN |
|---|---|---|
| network_information_section(){ | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     network_id | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved_future_use | 4 | bslbf |
|     network_descriotors_length | 12 | uimsbf |
|     for(i=0;i<N;i++){ | | |
|         descriptor() | | |
|     } | | |
|     reserved_future_use | 4 | bslbf |
|     transport_stream_loop_length | 12 | uimsbf |
|     for(i=0;i<N;i++){ | | |
|         transport_stream_id | 16 | uimsbf |
|         original_network_id | 16 | uimsbf |
|         reserved_future_use | 4 | bslbf |
|         transport_descriptors_length | 12 | uimsbf |
|         for(j=0;j<N;j++){ | | |
|             descriptor() | | |
|         } | | |
|     } | | |
|     CRC_32 | 32 | rpchof |
| } | | |

FIG.4

SURFACE DISTRIBUTION SYSTEM LIST

| TS_id | FREQUENCY | MODE | GUARD INTERVAL | AREA CODE |
|---|---|---|---|---|
| TS0 | ○○○MHz | 01 | 10 | 010110100101 |
| TS1 | ×××MHz | 10 | 11 | 101010010011 |
| TS2 | △△△MHz | 00 | 01 | 011001110100 |
| ⋮ | ⋮ | ⋮ | ⋮ | ⋮ |

FIG.5

SERVICE LIST

| SERVICE ID | SERVICE TYPE | TS_id |
|---|---|---|
| SERVICE 0 | TELEVISION BROADCASTING | TS0 |
| SERVICE 1 | AUDIO BROADCASTING | TS0 |
| SERVICE 2 | AUDIO BROADCASTING | TS1 |
| SERVICE 3 | AUDIO BROADCASTING | TS2 |
| ⋮ | ⋮ | ⋮ |

FIG.6

| DATA STRUCTURE | NUMBER OF BITS | INDICATES OF BIT COLUMN |
|---|---|---|
| linkage_descriptor(){ | | |
|     descriptor_tag | 8 | uimsbf |
|     descriptor_length | 8 | uimsbf |
|     transport_stream_id | 16 | uimsbf |
|     original_network_id | 16 | uimsbf |
|     service_id | 16 | bslbf |
|     linkage_type | 8 | uimsbf |
|     for (i=0;i<N;i++){ | | |
|         private_data_byte | 8 | bslbf |
|     } | | |
| } | | |

FIG.7

| SERVICE ID | SERVICE AREA ID |
|---|---|
| SERVICE 5 | AREA 20 |
| SERVICE 13 | AREA 20 |
| SERVICE 18 | AREA 30 |

FIG.8

| PRIORITY | SERVICE ID | SERVICE AREA ID |
|---|---|---|
| 2 | SERVICE 5 | AREA 20 |
| 3 | SERVICE 13 | AREA 20 |
| 1 | SERVICE 18 | AREA 30 |

FIG.9

DIGITAL BROADCASTING SYSTEM AND METHOD FOR AUTOMATICALLY LOCATING PROGRAMS AFTER RELOCATION

TECHNICAL FIELD

This invention relates to a digital broadcasting system and a digital broadcasting method for transmitting by a transmitter and for receiving by a receiver a terrestrial broadcast of program services of a succession of a plurality of events provided in the form of a transport stream. It also relates to a transmitter for transmitting the terrestrial broadcast and a receiver for receiving the terrestrial broadcast.

BACKGROUND ART

Terrestrial television broadcast or radio broadcast often uses a plurality of antennas for transmitting same programs because the service area of a single broadcast wave is limited. If the broadcast waves transmitted from the respective antennas have a same frequency, interference can occur in any areas where two or more than two service areas overlap one another. Then, noise can arise in the received sound and a so-called "ghost phenomenon" of multiplexed images can occur.

In view of this problem of terrestrial broadcasting, broadcast waves are conventionally transmitted by using different frequencies for them particularly in adjacent service areas in order to avoid interference of broadcast waves. Thus, when a receiver of a conventional terrestrial broadcasting system is moved from the service area of an antenna to that of another, it has to be tuned in to the frequency of the broadcast wave of the service area where the receiver is currently located.

Meanwhile, in recent years, research efforts have been paid for commercializing digital terrestrial broadcasting utilizing the MPEG-2 Systems (ITU-T H.222.0, ISO/IEC 13818-1) which is a compression transmission standard for audio and video information.

Since digital terrestrial broadcasting is adapted to transmit high quality sounds and images much better than conventional analog terrestrial broadcasting, there is a strong demand for digital terrestrial broadcasting systems. Additionally, digital terrestrial broadcasting can transmit various data to be utilized by way of computers and information terminals beside audio and video information. In other words, it can be used to transmit variety of combinations of different contents to provide various broadcasting services.

In the field of digital terrestrial broadcasting utilizing the MPEG-2 Systems, each broadcast unit such as a news coverage or a drama that starts and ends at predetermined respective hours is referred to as event and a given succession of a plurality of events is referred to as service. Many services are transmitted in the form of a transport stream. In the following description, the term "service" is reworded by "program" in order to avoid confusion between "service" and "service area".

Now, digital terrestrial broadcasting can be used by a same broadcaster to provide different programs in each service area because various contents can be combined and broadcast digitally with ease.

Then, if an audience enjoying an event being broadcast through a given channel in a service area moves into another service area, he or she may no longer be able to receive the event in the new service area. For instance, if an audience receiving a "cooking program" as an event transmitted through a given channel in a service area moves to an adjacent service area, he or she may now be forced to receive a "night base ball game coverage" transmitted through the same channel in the new service area.

Additionally, a plurality of affiliated broadcasters may broadcast a same event at a same time. However, if an audience receiving the event in a service area of a specific broadcaster moves into an adjacent service area where some other broadcaster is broadcasting the same event, he or she will have to carry out cumbersome operations for making his or her receiving set adapted to properly receive the broadcast of the event in that area. That is, the receiving set temporarily falls into the state in which it cannot receive the terrestrial broadcast signal. Then, the audience may stop receiving the terrestrial broadcast signal or switch to receive a terrestrial broadcast signal transmitted by another broadcaster.

DISCLOSURE OF THE INVENTION

In view of the above identified circumstances, it is therefore an object of the present invention to provide a digital broadcasting system and a digital broadcasting method that makes continuous reception of a digital terrestrial broadcast program possible without requiring cumbersome operations if an audience moves from a service area into another.

Another object of the present invention is to provide a transmitter for digital broadcasting and a receiver for receiving such digital broadcast.

In an aspect of the present invention there is provided a digital broadcasting system for transmitting by a transmitter and for receiving by a receiver a program prepared by arranging a continuous succession of events in the form of a transport stream for terrestrial broadcasting; said transmitter being adapted to provide said transport stream with link information showing the links between said transport stream of a program or events being broadcast in the service area of the transmitter for terrestrial broadcasting and the programs being broadcast in adjacent service areas; said receiver being adapted to select a program being transmitted in said adjacent service area on the basis of said link information added to the transport stream being transmitted in said service area when moves into one of the adjacent service areas.

In another aspect of the invention, there is provided a digital broadcasting transmitter for transmitting a program prepared by arranging a continuous succession of events in the form of a transport stream for terrestrial broadcasting, said transmitter comprising: a link information providing means for providing said transport stream with link information showing the links between said transport stream of a program or events being transmitted in the service area of terrestrial broadcasting and the programs being transmitted in adjacent service areas.

In still another aspect of the invention, there is provided a digital broadcasting receiver for receiving a program prepared by arranging a continuous succession of events in the form of a transport stream for terrestrial broadcasting, said receiver comprising: a link information extraction means for extracting the link information showing the links between said transport stream, program or events being transmitted in the service area of terrestrial broadcasting and the programs being transmitted in adjacent service areas; and a program selection means for selecting a program being transmitted in an adjacent service area on the basis of said link information added to the transport stream being transmitted in said service area when said receiver moves into said adjacent service area.

In still another aspect of the invention, there is provided a digital broadcasting receiver for receiving a program prepared by arranging a continuous succession of events into a transport stream by means of a terrestrial, said receiver comprising: a link information extraction means for extracting the link information showing the links between said transport stream of a program or events being transmitted in the service area of terrestrial broadcasting and the programs being transmitted in adjacent service areas; and a program selection means for giving priorities to the links by referring to said link information and selecting a program being transmitted in an adjacent service area on the basis of said priorities when said receiver moves into said adjacent service area.

In a further aspect of the invention, there is provided a digital broadcasting method for transmitting a transport stream as terrestrial digital broadcasting, the transport stream containing a program prepared by arranging a continuous succession of events into a transport stream, said method comprising: generating a transport stream provided with a link descriptor describing information on adjacent service areas and adapted to replace said transport stream, program or events being broadcast in the service area; and transmitting said transport stream provided with said link descriptor.

BRIEF DESCRIPTION OF THE DRAWINGS

FIG. 4 is a schematic illustration of an NIT that can be contained in a transport stream that can be transmitted by the transmitter of FIG. 2.

FIG. 5 is a schematic illustration of a terrestrial delivery list that can be included in the NIT of FIG. 4.

FIG. 6 is a schematic illustration of a service list that can be included in the NIT of FIG. 4.

FIG. 7 is a schematic illustration of a link descriptor that can be included in the NIT of FIG. 4.

FIG. 8 is a schematic illustration of an example of link information with which a transport stream that is to be transmitted by the transmitter of FIG. 2 can be provide.

FIG. 9 is a schematic illustration of another example of link information with which a transport stream that is to be transmitted by the transmitter of FIG. 2 can be provide.

BEST MODE FOR CARRYING OUT THE INVENTION

Figure 1:
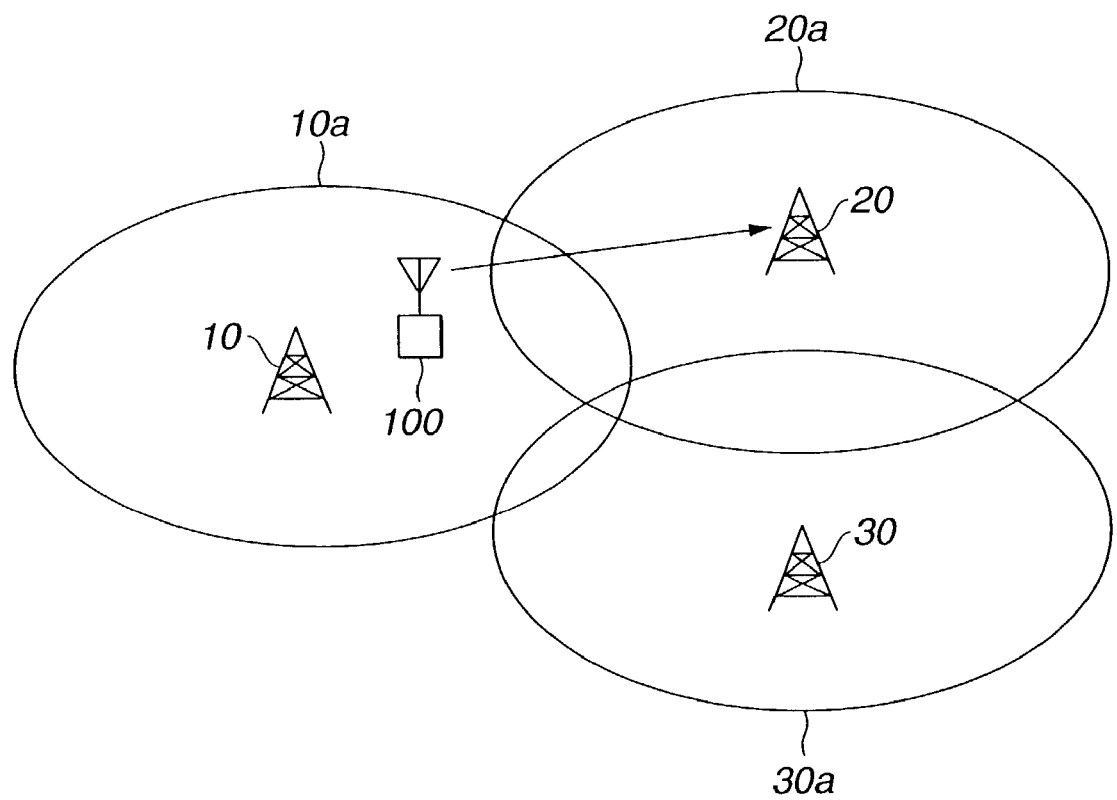
FIG. 1 is a schematic illustration of a digital broadcasting system according to the invention.

Now, the present invention will be described by referring to the accompanying drawings that illustrate the presently best mode of carrying out the invention. The present invention is suitably applicable to a digital broadcasting system 1 as shown in FIG. 1. Note, however, that the applicability of the present invention is by no means limited to a digital broadcasting system 1 as shown in FIG. 1 and the invention can be applied broadly to various systems adapted to transmit and receive digital terrestrial broadcasts. More specifically, the present invention is applicable to television broadcasting adapted to transmit moving images and sound information in combination, radio broadcasting adapted to transmit only sound information, data broadcasting adapted to transmit various data that can be utilized by way of computers and other information terminals and multimedia broadcasting that is a combination of television or radio broadcasting and data broadcasting.

Referring to FIG. 1, the digital broadcasting system 1 is so designed that a plurality of broadcasting stations 10, 20, 30 digitally transmit respective terrestrial broadcasts, which are received at least by a receiver 100.

The broadcasting stations 10, 20, 30 are provided with respective transmitters that transmit respectively broadcast waves by way of antennas. The broadcast waves transmitted from the broadcasting stations 10, 20, 30 have respective limited service areas 10a, 20a, 30a where the receiver 100 can effectively be used for receiving the transmitted respective signals.

The terrestrial broadcast transmitted from each of the broadcasting stations 10, 20, 30 is a digital terrestrial broadcast utilizing the MPEG-2 Systems (ITU-T H.222.0, ISO/IEC 13818-1) which is a compression transmission standard for audio and video information.

In the field of digital terrestrial broadcasting utilizing the MPEG-2 Systems, each broadcast unit such as a news coverage or a drama that starts and ends at predetermined respective hours is referred to as event and a given succession of a plurality of events is referred to as service. Many services are transmitted in the form of a transport stream. In the following description, the term "service" is reworded by "program" in order to avoid confusion between "service" and "service area".

With the illustrated digital broadcasting system 1, when the receiver 100 moves from the service area 10a into the service area 20a that is located next to the service area 10a, it can no longer receive the terrestrial broadcast being transmitted from the broadcasting station 10. Instead, it can receive the terrestrial broadcast being transmitted in the service area 20a.

In such a case, with a conventional terrestrial broadcasting system, the receiver is required to be operated for switching the reception frequency in order to properly receive the terrestrial broadcast being transmitted in said adjacent service area after the move into the adjacent service area. Such a switching operation is required each time the receiver moves from a service area into an adjacent service area.

Particularly, in recent years, various receivers for receiving terrestrial broadcasts have been down-sized and made lightweight so as to be mounted on various portable and mobile type information terminals. When a car navigation system of an automobile is provided with a receiver or a portable and mobile information terminal provided with a receiver is used in an automobile or a train, it will move by a long distance in a short period of time. In other words, it will move quickly and frequently from a service area into another so that the cumbersome switching operation will have to be repeated frequently to a great disadvantage on the part of the user.

However, with the digital broadcasting system 1 according to the invention, the transmitter of each of the broadcasting stations 10, 20, 30 is adapted to transmit the transport stream with link information showing link between the transport stream, program or events being broadcast in its service area for terrestrial broadcasting and the programs being broadcast for terrestrial broadcasting in adjacent service areas and the priorities of the various links. Additionally, the receiver 100 is so adapted that, when it moves from a service area where it is receiving a terrestrial broadcast into an adjacent service area, it receives the program being transmitted in the adjacent service area where it is now located by referring to the link information contained in the transport stream.

Therefore, the broadcaster running the broadcasting stations can select in advance the program to be broadcast in the adjacent service area 20a and hence linked to a specific transport stream, program or events to be broadcast in the service area 10a and contain it in the link information. Then, as the transport stream is provided with the link information and broadcast from the broadcasting station 10, the receiver 100 can automatically receive the program being transmitted in the adjacent service area 20a that is linked to the transport stream, program or events transmitted in the service area 10a when it moves from the service area 10a into the adjacent service area 20a.

Similarly, if a number of affiliated broadcasters broadcast a same event simultaneously, the receiver 100 can automatically receive the transmission of the event if it moves from the service area 10a into the adjacent service area 20a.

Thus, it is now possible to freely and flexibly link the terrestrial broadcasting operations in the service area 10a and the adjacent service areas 20a, 30a. Therefore, if the receiver 100 moves from a service area to another, it can continue receiving appropriate programs so that the user of the receiver will not stop watching or listening to a program nor tuning in to some other station because no interruption of transmission occurs, if temporarily.

As described above, with the digital broadcasting system 1, the transmitter of the broadcasting station 10 provides the transport stream being transmitted with link information showing the link between said transport stream, program or events being broadcast in the service area 10a of the transmitter for terrestrial broadcasting and the programs being broadcast in adjacent service areas 20a, 30a. Additionally, link information shows the priorities of the programs in the service areas. For example, the program being transmitted in the adjacent service area 20a may have priority "1", while the one being transmitted in the adjacent service area 30a may have priority "2".

When the receiver 100 moves from the service area 10a into the adjacent service area 20a, it identifies the program being transmitted in the adjacent service area 20a by detecting the link between the program and the one being transmitted in the service area 10a on the basis of the link information contained in the transport stream it has received in the service area 10a.

If it is not possible for the receiver 100 to make clear if the place where it moves in is in the adjacent service area 20a or the adjacent service area 30a, it may have to find out (search) which of the programs being transmitted in the service areas 20a, 30a can be received by referring to the link described in the link information. Then, it will try to find out the right program by sequentially searching the programs according to the priority of link so that the link that the broadcaster gives the highest priority will be tried first.

Therefore, it is preferable to give the highest priority to the program that is broadcast in the adjacent service area where the receiver most probably moves in, taking the geographical conditions of the service areas. Then, the receiver 100 will firstly search the program of the service area having the highest priority to consequently reduce the time necessary for the search operation.

More specifically, if there are a number of adjacent service areas, it is preferable to give the highest priority to the adjacent service area that is located in an administrative unit region (city, town, village) same as that of the original service area or the adjacent service area that is conveniently accessible from the original service area because the two service areas are linked by high ways and/or railways. Conversely, low priority may be given to the adjacent service areas that are not easily accessible from the original service area because of interposition of mountains and/or waters.

According to the present invention, link information does not necessarily indicate a single link in each adjacent service area. Two or more than two transport streams or a transport stream containing a plurality of programs may be transmitted in each service area. Then, two or more than two programs will be broadcast in each service area.

If such is the case, the link information will show the links of the two or more than two programs in the adjacent service area in addition to the link between the original service area and the adjacent service area. Then, priorities will be given to all the programs in the same adjacent service area and the link information will contain these priorities.

When a number of programs are broadcast in an adjacent service area, the highest priority is preferably given to the link of broadcasting a same event in the original service area and the adjacent service area or, if not a same event, similar events of a same category such as "cooking program" or "night base ball game coverage". Priorities may be given in the order of the link in the adjacent service area of transmitting same events in all time slots, that of currently transmitting a same event in a same time slot although the different events may be transmitted in other time slots and that of transmitting different events of affiliated broadcasters.

As described above, according to the invention, the transmitter of each of the linked broadcasting stations provides the transport stream being transmitted from it with link information showing the links between its own transport stream and the programs being transmitted in adjacent service areas and the priorities given to the links. Therefore, if a receiver moves from the original service area into an adjacent service area, it can efficiently switch to the program being transmitted in the adjacent service area without requiring cumbersome switch operations simply by referring to the link information.

Figure 2:
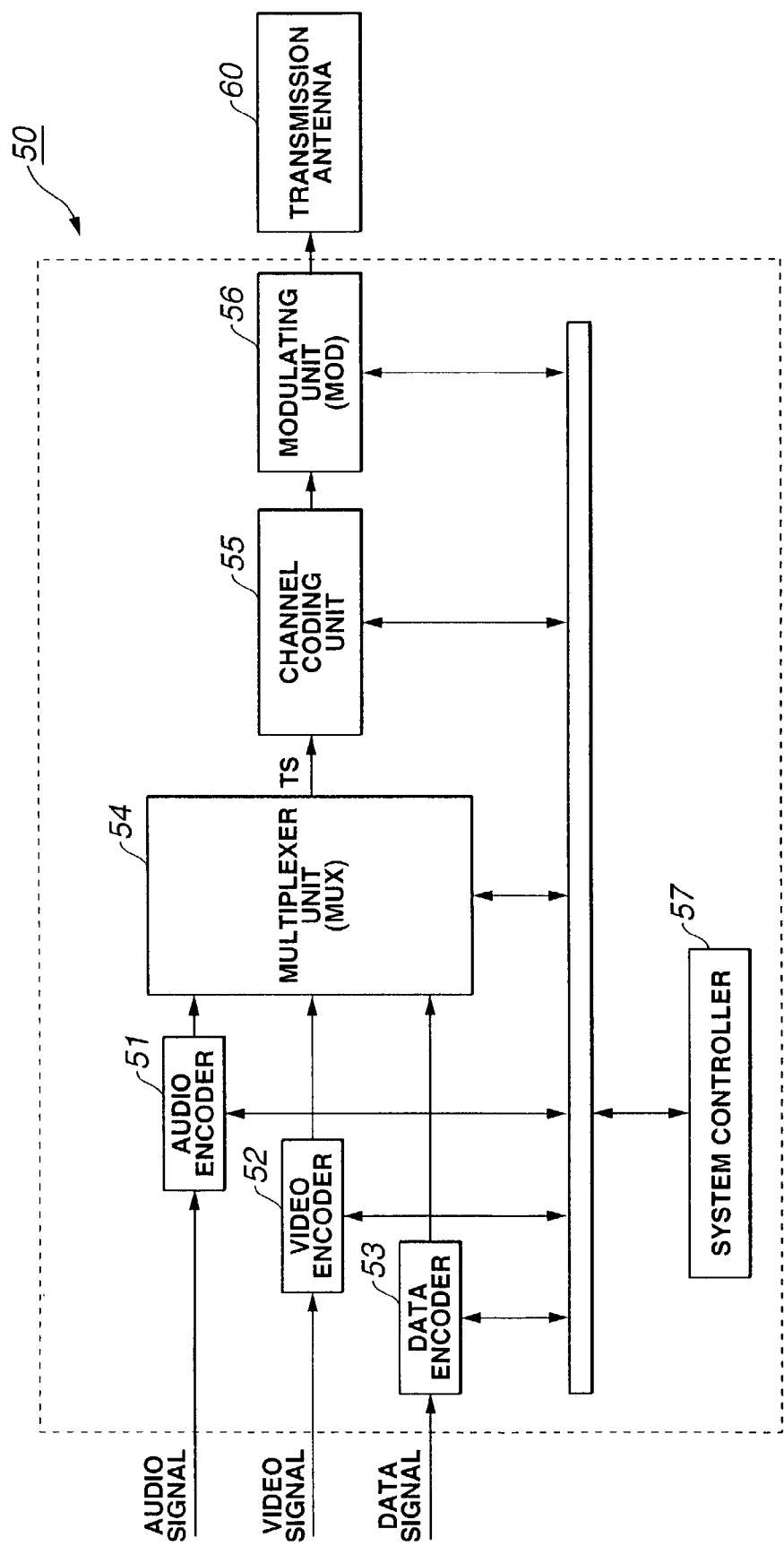
FIG. 2 is a schematic functional block diagram of a transmitter according to the invention and adapted to be used as a digital transmitter according to the invention.

Now, the transmitter that is used in each of the broadcasting stations of the above discussed digital broadcasting system 1 will be described below. FIG. 2 shows a transmitter 50 realized by applying the concept of digital broadcasting transmitter according to the invention.

Referring now to FIG. 2, the transmitter 50 comprises an audio encoder 51 for receiving an audio signal, a video encoder 52 for receiving a video signal, a data encoder 53 for receiving a data signals, a multiplexer unit 54 for generating a transport stream by multiplexing the data obtained by the encoders as a result of encoding, a channel coding unit 55 for processing the transport stream for error correction coding and other operations, a modulator unit 56 for generating a broadcast signal by digitally modulating the transport stream processed by the channel coding unit 55 in a way adapted to broadcasting and a system controller 57 for controlling the operation of each of the components of the transmitter 50.

The signal to be broadcast that is produced from the modulator unit 56 is output to the transmission antenna 60 connected to the transmitter 50 and transmitted from the transmission antenna 60 as broadcast wave.

The audio encoder 51, the video encoder 52 and the data encoder 53 respectively receive an audio signal, a video signal and a data signal and process them for compression cording before they output digital data. The audio signal, the video signal and the data signal respectively contain sound information, image information and various data to be used by way of computers and various information terminals. In other words, information on the program to be contained in the broadcast wave and transmitted is input to the encoders.

It will be appreciated that the transmitter 50 does not need the video encoder 52 and the data encoder 53 when the broadcasting stations are radio broadcasting stations and adapted to transmit only sound information.

The multiplexer unit 54 packetizes the bit stream of digital data output from the each of the encoders and multiplexes the bit streams from the encoders to generate a transport stream conforming to the MPEG-2 Systems. For this operation, the multiplexer unit 54 receives link information which will be discussed hereinafter and various pieces of information necessary for the broadcasting such as time information from the system controller and carries out a processing operation necessary for providing the transport stream with the information.

When a single transport stream is made to contain a plurality of programs (services) and transmitted by the transmitter 50, the transmitter 50 is provided with two or more encoders of each of the above identified types so that it combines a plurality of bit streams on a program by program basis and performs a multiplexing operation.

The channel coding unit 55 processes the transport stream produced from the multiplexer unit 54 for error correction coding and subsequently for interleaving for the purpose of enhancing the error correction capability of transforming successive errors into random errors. Additionally, it performs a processing operation of framing for adding a synchronizing signal to the transport stream so that the receiver 100 may be relieved of any trouble in terms of synchronization.

Figure 3:
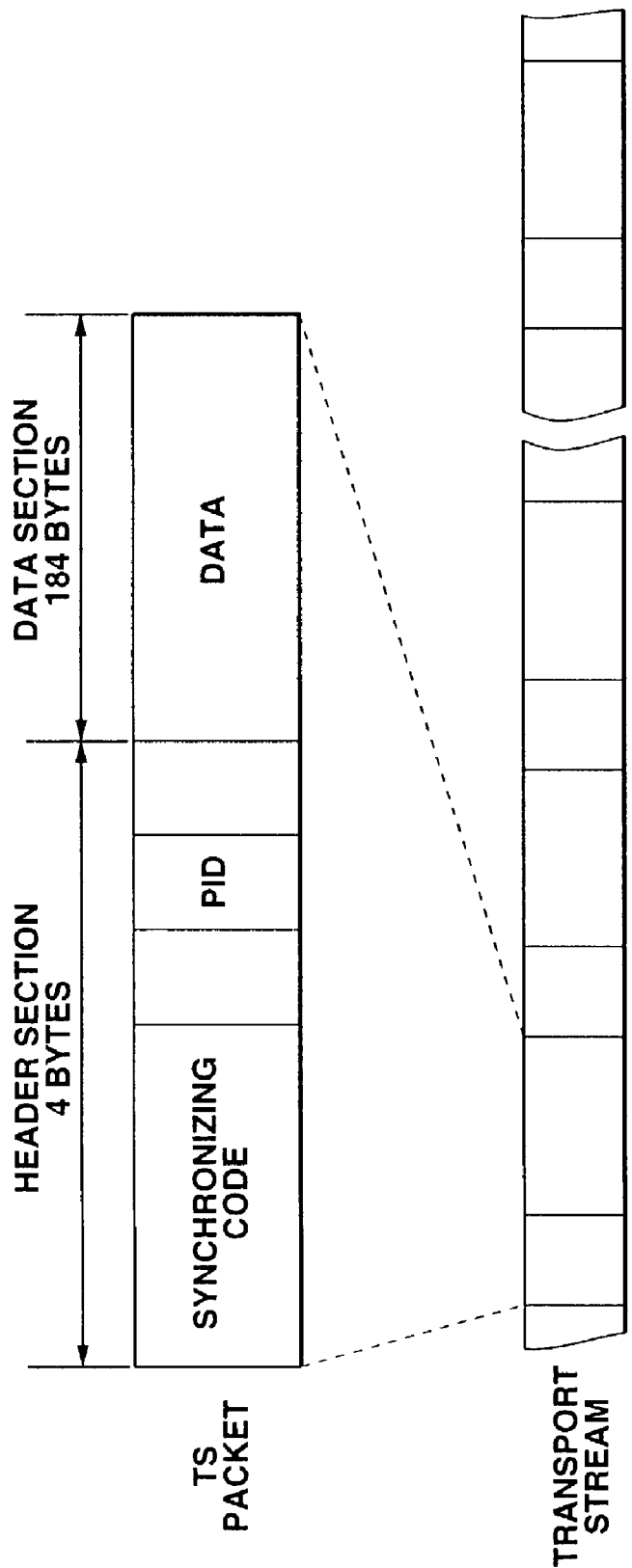
FIG. 3 is a schematic illustration of a transport stream that can be transmitted by the transmitter of FIG. 2.

The transport stream generated by the multiplexer unit 54 and the channel coding unit 55 has a configuration as shown in FIG. 3. More specifically, referring to FIG. 3, the transport stream comprises a plurality of consecutively arranged transport stream packets (TS packets). Each TS packet has a 4-byte header section and a 184-byte data section to make the total number of bytes equal to 188. The header section of a TS packet contains a synchronizing symbol to be used for synchronization and a PID (packet identification number) for identifying the TS packet. The data section of a TS packet contains information contents to be transmitted by way of a terrestrial for broadcasting.

The modulator unit 56 processes the transport stream produced from the channel coding unit 55 for digital modulation in order to make it highly efficient and resistive against errors from the broadcasting point of view. More specifically, the OFDM (orthogonal frequency division multiplexing) method may be used for as modulation method.

In the transmitter 50, the processing operation of the audio encoder 51 and that of the video encoder 52 conform respectively to the MPEG Audio and the MPEG Video, while the processing operation of the multiplexer unit 54 conforms to the MPEG-2 Systems.

The system controller 57 controls the operation of each of the components of the transmitter 50 by exchanging various signals with it. Additionally, the system controller 57 generates link information and other various pieces of information necessary for broadcasting such as time information and output them to the multiplexer unit 54.

The link information shows the link between the transport stream, program or events being broadcast in the service area of the transmitter 50 for terrestrial broadcasting and the programs being broadcast for terrestrial broadcasting in adjacent service areas and the priorities of the various links.

The link information with which the transport stream produced from the transmitter 50 is provided is prepared in advance by the controller 57 of the transmitter 50. Then, the link information prepared by the controller 57 is added to the transport stream by the multiplexer unit 54.

More specifically, the multiplexer unit 54 put the link information into the link descriptor described in the NIT (network information table) as shown in FIG. 4. An NIT is defined by the Association of Radio Industries and Businesses (ARIB STD-B10) on the basis of the basic table structure defined in the MPEG-2 Systems. An NIT is a table showing information on the physical configuration of the transport stream transmitted by a network and the characteristics of the network itself.

According to the invention, the link information is not necessarily put into the link descriptor described in an NIT. It is only necessary for the link information to be added to a predetermined position of the transport stream. However, conventionally, an NIT contains a link descriptor in a region to be used for describing information necessary for identifying the service provided in response to a request of a receiver for additional information relating to any specific item described in the SI (service information). Therefore, a transport stream can be easily provided with link information by describing the link information in the link descriptor of the NIT of the transmitter 50.

Now, an NIT will be described briefly by referring to FIG. 4. An NIT has a data structure as shown in FIG. 4 according to the MPEG-2 Systems and transmitted by a TS packet whose PID is equal to "0x0010". In FIG. 4, [table_id] is the identifier for identifying the type of the network information section. A value of "0x41" is described when the NIT is that of its own network, whereas a value of "0x41" is described when the NIT is that of some other network. In other words, when link information on its own network is contained in the NIT, the link information has to be added to the network information section with "0x40".

In FIG. 4, [section_syntax_indicator] is the identifier for identifying the section syntax indicator and its value is constantly equal to "1", whereas [section_length] is the identifier for identifying the number of bytes from immediately after the section length field to the tail end of the section containing CRC (cyclic redundancy check). [network_id] is the identifier for identifying the distribution system indicated by the NIT and discriminate it from other distribution systems.

[version_number] is the identifier for identifying the version number of the subtable. [current_next_indicator] indicates that the sub-table is the current sub-table when it is equal to "1" and that the sub-table being sent is not applicable and the next sub-table is to be used when it is equal to "0". [section_number] is the identifier for identifying the section number. The value of "0x00" is given when the section is the first section in the sub-table. "1" is added to the section number each time a section having same [table_id] and [network_id] is added.

[last_section_number] is the identifier for identifying the last section, or the section having the largest section number, of the sub-table to which the section belongs. [network_descriptors_length] is the identifier for identifying the total number of bytes of the loop of the network descriptors (descriptor ( )) that follow. [transport_stream_loop_length] is the identifier for identifying the total number of bytes of the transport stream loop that ends immediately before the first byte of the CRC.

[transport_stream_id] in the transport stream loop is the identifier for identifying the transport stream from the multiplexed other transport streams in the distribution system. [original_network_id] is the identifier for showing the [network_id] of the original distribution system. [transport_descriptors_length] is the identifier for identifying the total number of bytes of the loop of the network descriptors that follow. [CRC_32] is the identifier for indicating the CRC having a CRC value that makes the register output equal to "0" after processing the entire section.

In the NIT having the above described data structure, link descriptors preferably operate as network descriptors in the transport stream loop. The network descriptors in the transport stream loop include service list descriptors, emergency information descriptors, system control descriptors, partial reception descriptors, terrestrial delivery system descriptors and other network descriptors beside the link descriptors. Of these descriptors, the terrestrial delivery system descriptors are used to describe the terrestrial delivery system list having a table structure as shown in FIG. 5. The service list descriptors are used to describe the service list having a table structure as shown in FIG. 6. The terrestrial delivery system list and the service list show information relating to the transport streams being transmitted in all the service areas arranged in the form of a table on the basis of "ts_id" of each transport stream.

The information including "frequency", "mode", "guard interval" and "area code" necessary for receiving the transport stream whose "ts_id" is "TS1" can be known by referring to the terrestrial delivery system list. As shown in FIG. 5, they are "xxxMhz", "10", "11" and "101010010011" respectively. Similarly, "service ID" and "service type" necessary for identifying the program (service) contained in the transport stream whose "ts_id" is "TS1" can be known by referring to the service list. As shown in FIG. 6, they are "service 2" and "sound broadcasting" respectively.

Thus, the receiver 100 can switch from the program (service) it is receiving currently to some other program (service) by referring to the terrestrial delivery system list and the service list.

Note that the NIT does not need to describe all the information on the transport streams being transmitted in all the service areas by means of a terrestrial delivery system list and a service list. Alternatively, it may describe only the transport streams being transmitted in some service areas. For example, the NIT may be made to describe information on the transport streams being transmitted in the original service area and the adjacent service areas by means of a terrestrial delivery system list and service list.

Limiting the information contained in the terrestrial delivery system list and the service list provides the following advantage.

A bit rate of about 20 Mbps is currently used for satellite broadcasting such as BS broadcasting and CS broadcasting. Therefore, transport streams of satellite broadcasting are made to contain SI (service information) and PSI (program specific information). However, the bit rate will be as low as about 400 kbps for digital terrestrial radio broadcasting.

If the SI and PSI of all the programs (services) of a delivery system is transmitted as in the case of BS and CS broadcasting, the transmission bandwidth will practically have to be dedicated to the SI and PSI to remarkably reduce the efficiency of transmitting a proper program. The efficiency of transmitting a proper program can be maintained by limiting the volume of information on other programs (services) when the NIT is made to describe information on the transport streams being transmitted in the original service area and the adjacent service areas by means of a terrestrial delivery system list and service list.

Now, a link descriptor will be described. A link descriptor is defined by the ARIB on the basis of the descriptor format defined in the MPEG-2 Systems. It has a data structure as shown in FIG. 7 (ARIB STD-B10).

Referring to FIG. 7, [descriptor_tag] is the identifier for identifying various network descriptors. A predetermined value is described for a link descriptor. The value to be described by [descriptor_tag] needs to conform to the MPEG-2 Systems and may vary depending on the type of network descriptor. [descriptor_length] is the identifier for identifying the total number of bytes of the data portion of the network descriptor that immediately follows the identifier.

[transport_stream_id] is the identifier for identifying the transport stream containing the information service indicated by the link descriptor. [original_network_id] is the identifier for identifying the network of the original delivery system of the information service indicated by the link descriptor. [service_id] is the identifier for identifying the programs contained in the transport stream indicated by the [transport_stream_id] if the transport stream contains more than one programs (services). [linkage_type] is the identifier for identifying the link information including the link type. [private_data_byte] is the identifier having an individually defined value.

While a link descriptor has a data structure conforming to the provision of the MPEG-2 Systems as described above, the existing digital broadcasting systems have not discussed about how to use link descriptors. In other words, the existing digital broadcasting systems do not use link descriptors.

On the other hand, a transmitter 50 according to the invention provides a transport stream with link information by using link descriptors. Now, link information that is used for the purpose of the present invention will be discussed below.

For the purpose of the invention, link information has a table structure as shown in FIG. 8. Referring to FIG. 8, link information contains service area IDs for identifying the service areas adjacent to the original service area and service IDs for identifying the programs (services) to be linked in the respective adjacent service areas.

More specifically, referring to FIG. 1, service area ID "area 20" is given to the service area 20a of the broadcasting station 20 while service area ID "area 30" is given to the service area 30a of the broadcasting station 30. When the receiver 100 moves from the original service area 10a into the adjacent service area 20a, it refers to the link information and selects the program (service) with service ID "service 5" of the service area ID "area 20" for reception.

In the link information shown in FIG. 8, the programs (services) with service IDs "service 5" and "service 13" are those being transmitted in the service area 20a, while the program (service) with service ID "service 18" is the one being transmitted in the service area 30a.

It will be appreciated that, for the purpose of the present invention, link information does not necessarily have a table structure as shown in FIG. 8 and may alternatively have any appropriate form so long as it shows the link between the transport stream of a program or events (services) being transmitted in the original service area and the programs (services) being transmitted in the adjacent service areas.

If, for instance, a service ID is unique information that does not depend on service areas, it may not need any service area ID. If such is the case, the service ID of the program being transmitted in each service area can be identified on the basis of the area code of the service area by referring to the terrestrial delivery system list and the service list.

In the link information, the order of appearance of the service IDs in the table structure indicates the priorities given to them. In the instance of FIG. 8, the "service 5" has the highest priority and the "service 18" has the lowest priority.

As the receiver 100 moves from the original service area into an adjacent service area and searches the linked station of the latter service area, it firstly searches the program having the highest priority.

The broadcaster defines the links in advance, and link descriptors are used to describe the link information in the transmitters 50.

More specifically, identifiers [service_id]s of link descriptors are used to describe the service IDs shown in FIG. 8 and identifiers [transport stream id]s and [original_network_id] of link descriptors are used to describe the information on the linked transport streams and the network identified by the service IDs.

If the service area IDs shown in FIG. 8 are contained in the link information, identifiers [linkage_type]s and [private_data_byte] may be used to describe the service area IDs. Link descriptors may be expanded to provide new identifiers and the new identifiers may be used to describe the service area IDs. The service area to which a linked program (service) belongs can be determined by referring to the three descriptors of the link descriptor, the terrestrial delivery system descriptor and the service list descriptor without relying on the service ID. In other words, the link information may not necessarily contain service area Ids.

Link descriptors are used to describe the links which indicate link stations, and the NIT is used to describe a plurality of link descriptors in priority order, therefore it enables to provide the link information having a table structure shown in FIG. 8 with the link descriptors in the NIT.

The present invention is not limited to make the NIT contain as many link descriptors as the number of links. For instance, link descriptors may be expanded in such a way that a number of links are described by a single link descriptor.

Link information may have a table structure as shown in FIG. 9 instead of the table structure shown in FIG. 8. Unlike FIG. 8, where the order of appearance of the service IDs in the table structure indicates the priorities given to them, a column of "priority" is shown in the table of FIG. 9 to indicate the priorities given to the linked programs (services). In FIG. 9, the service with service ID "service 18" has the highest priority and is followed by the service with service ID "service 5" and the service with service ID "service 13".

When a "priority" column is provided in the link information, identifiers [linkage_type]s and [private_data_byte] may be used to describe the "priority".

Additionally, by providing a "priority" column in the link information, it is possible to give priorities to a number of links. For example, priority "1" may be given to two linked services with service IDs "service 5" and "service 18".

Thus, the transmitter 50 according to the invention transmits its service with an NIT containing link information describing links between [the transport stream being transmitted in the original service area] and [the programs (services) contained in the respective transport streams being transmitted in the adjacent service areas] and the priorities given to them.

Therefore, when the transport stream 1 of the original service area being transmitted contains a single program (service), the program is linked to some other program. On the other hand, when the transport stream 1 contains two or more than two programs (services), the transport stream 1 itself is linked to some other program (service). When, it is not possible to specify a specific program (service) out of the programs (services) contained in the transport stream.

Then, the transmitters 50 according to the invention may provide the SDT (service description table) with link information instead of providing the NIT with link information. The SDT is a table showing information on the programs (services) contained in the transport stream and defined by the (ARIB STD-B10) on the basis of the basic table structure that is defined in the MPEG-2 Systems. Then, the transmitter 50 can link each of the programs (services) contained in the transport stream to a program (service) in an adjacent service area.

Still alternatively, the transmitter 50 according to the invention may provide the EIT (event information table) with link information. The EIT is a table showing information on each of the events contained in the program (service) or each of the programs (services) contained in the transport stream and defined by the ARIB (ARIB STD-B10) on the basis of the basic table structure that is defined in the MPEG-2 Systems. The transmitter 50 can set the programs (services) on each of the events in the adjacent service areas by providing the EIT with the link information.

Thus, it is possible to used link descriptors for describing link information when providing the SDT or EIT with the link information as in the case of providing the NIT with the link information.

Figure 10:
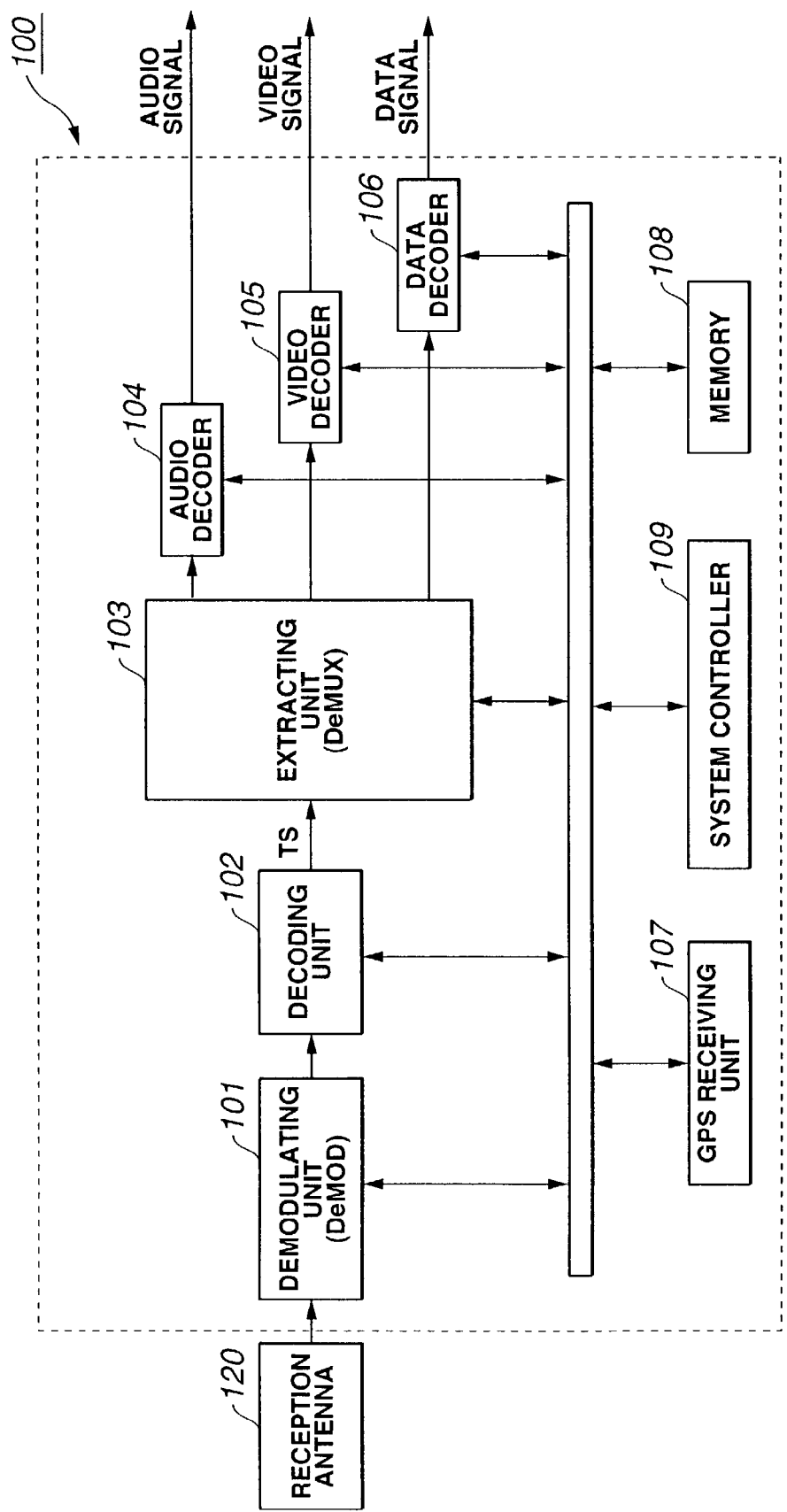
FIG. 10 is a schematic functional block diagram of a receiver according to the invention and adapted to be used as a digital receiver according to the invention.

Now, the receiver 100 adapted to receive the terrestrial broadcast transmitted by the transmitter 50 will be described. FIG. 10 shows a receiver 100 realized by applying the concept of digital broadcasting receiver according to the invention.

As shown in FIG. 10, the receiver 100 comprises a demodulator unit 101 for receiving a terrestrial broadcast signal transmitted from the transmitter 50 and for digitally demodulating the broadcast signal, a decoding unit 102 for decoding the signal digitally demodulated by the demodulator unit 101 and taking out the transport stream, an extracting unit 103 for extracting the digital data multiplexed in the transport stream taken out by the decoding unit 102 and producing an output corresponding to the digital data, an audio decoder 104 for receiving the digital data extracted by the extracting unit 103 and generating an audio signal, a video decoder 105 for also receiving the digital data extracted by the extracting unit 103 and generating a video signal, a data decoder 106 for also receiving digital data extracted by the extracting unit 103 and generating a data signal, a GPS (global positioning system) receiving unit 107 for detecting the current position of the receiver on the basis of the signal transmitted from the GPS, a memory 108 for storing the link information contained in the transport stream and a system controller 109 for controlling the operation of each of the components of the receiver 100.

The demodulator 101 corresponds to the modulator 56 of the transmitter 50 and is adapted to process the broadcast signal input through the reception antenna 120 for digital demodulation.

The decoding unit 102 corresponds to the channel coding unit 55 of the transmitter 50 and is adapted to process the digitally decoded signal from the demodulator 101 for deinterleaving and error correction decoding and take out the transport stream.

The extracting unit 103 extracts each of the TS packets on the basis of the PIDs (packet identification numbers) carried by the respective TS packets in the transport stream input from the decoding unit 102 and determines if the digital data contained in each of the TS packets belongs to an audio signal or a video signal. Then, it sends the digital data contained in the packet to either the audio decoder 104 or the video decoder 105, whichever appropriate. The extracting unit 103 also extracts the NIT contained in the transport stream and sends the information contained in the NIT to the system controller 109. Similarly, the extracting unit 103 also extracts the SDT and the EIT contained in the transport stream and sends the information contained in the SDT and EIT to the system controller 109.

The audio decoder 104, the video decoder 105 and the data detector 106 process the respective digital data input from the extracting unit 103 for decoding and generate an audio signal, a video signal and a data signal respectively.

It will be appreciated that the receiver 100 does not need the video decoder 105 and the data decoder 106 when the broadcasting stations are radio broadcasting stations and adapted to transmit only sound information.

The GPS receiving unit 107 receives the signal transmitted from the GPS (global positioning system) and detects the current position of the receiver 100 on the basis of the signal. With the provision of the GPS receiving unit 107, the receiver 100 can reliably detect its current position. Therefore, if there are a number of adjacent service areas that are located close to the original service area where it is receiving a transport stream, it can immediately determine the adjacent service area that is closest to the original service area. Then, the receiver 100 can optimally selects the adjacent service area for receiving a program (service) at the current position out of the plurality of adjacent service areas by referring to the link information contained in the NIT. Thus, it can immediately receive the linked program (service) of the adjacent service area.

It should be noted, however, that the receiver 100 is not limited to comprising a GSP receiving unit 107. Alternatively, it may be so adapted that the receiver 100 receives a reference signal transmitted from a predetermined terrestrial broadcasting station and detects its current position on the basis of the reference signal. Still alternatively, it may be so arranged that the receiver 100 is provided with an input section for receiving various pieces of information including the postal code, the telephone area code, the name of the prefecture and that of the service area of the current position and determines the current position on the basis of any of such pieces of information.

Still alternatively, the receiver 100 may not be provided with means for detecting the current position where it is receiving a terrestrial broadcast. If such is the case, the receiver 100 sequentially tries to see which of the linked programs (services) belonging to the adjacent service areas can be received on the basis of the link information contained in the NIT and selects the program (service) it can receive optimally.

The memory 108 may be a rewritable semiconductor memory that may be removably fitted to the receiver 100.

The system controller 109 controls the operations of the various components of the receiver by exchanging various signals with them. It also extracts the link information contained in the NIT input to it from the extracting unit 103 and stores it in the memory 108.

When the signal reception level of the output of the demodulating unit 101 101 goes under a predetermined value, the system controller 109 determines that the receiver 100 has moved out of the original service area and controls the demodulating unit 101 so as to receive the optimal program (service) at the current position by referring to the link information stored in the memory 108.

The signal receiving level of the receiver 100 may fall under the predetermined level in the original service area particularly when it is in a tunnel or the signal it is receiving is blocked by a building or some other barrier. If such a fall is expected to occur frequently, the receiver is preferably so arranged that a low value may be selected for the threshold level at which the controller 109 switches from the current transport stream to a linked program. Additionally, it is preferable that the operation of switching from the current transport stream to a linked program can be conducted automatically or manually in a selectable way.

It will be appreciated that the present invention is by no means limited to that the receiver 100 determines that it has moved out of the original service area when the signal reception level of the output of the demodulating unit goes under a predetermined level. For instance, it may alternatively be so arranged that the receiver 100 determines if it has moved out of the original service area or not on the basis of the current position as detected by the GPS receiving unit 107.

Additionally, the receiver 100 may be so arranged that the system controller 109 gives priorities to various links according to its own decision by referring to the link information contained in the received transport stream. If such is the case, the receiver 100 can decides the priorities to be given to various links if the link information shows only links without their respective priorities levels.

When the receiver 100 decides priorities of its own accord, preferably the system controller 109 stores the history of moving among the service areas in the memory 108 and gives high priorities to the links of the service area where it will move frequently by referring to the link information and the moving history. Alternatively, it may be so arranged that the system controller 109 stores the predetermined priorities given respectively to the service areas in the memory 108 and gives higher priorities to the links of a service area having high priority by referring to the priority of each of the service areas and the link information. Still alternatively, it may be so arranged that the system controller 109 gives higher priorities to the links of a service area having a large number of links.

As the receiver 100 gives priorities to the service areas and the links of its own accord, it can reliably select an optimal link in the service area where it moves in so that it can quickly and reliably switch to the program (service) it should receive.

Now, the operation of the receiver 100 having the above described configuration for switching from the program (service) it is currently receiving to another program (service) when it moves from a service area to another will be described by referring to the flow chart of FIG. 11.

Figure 11:
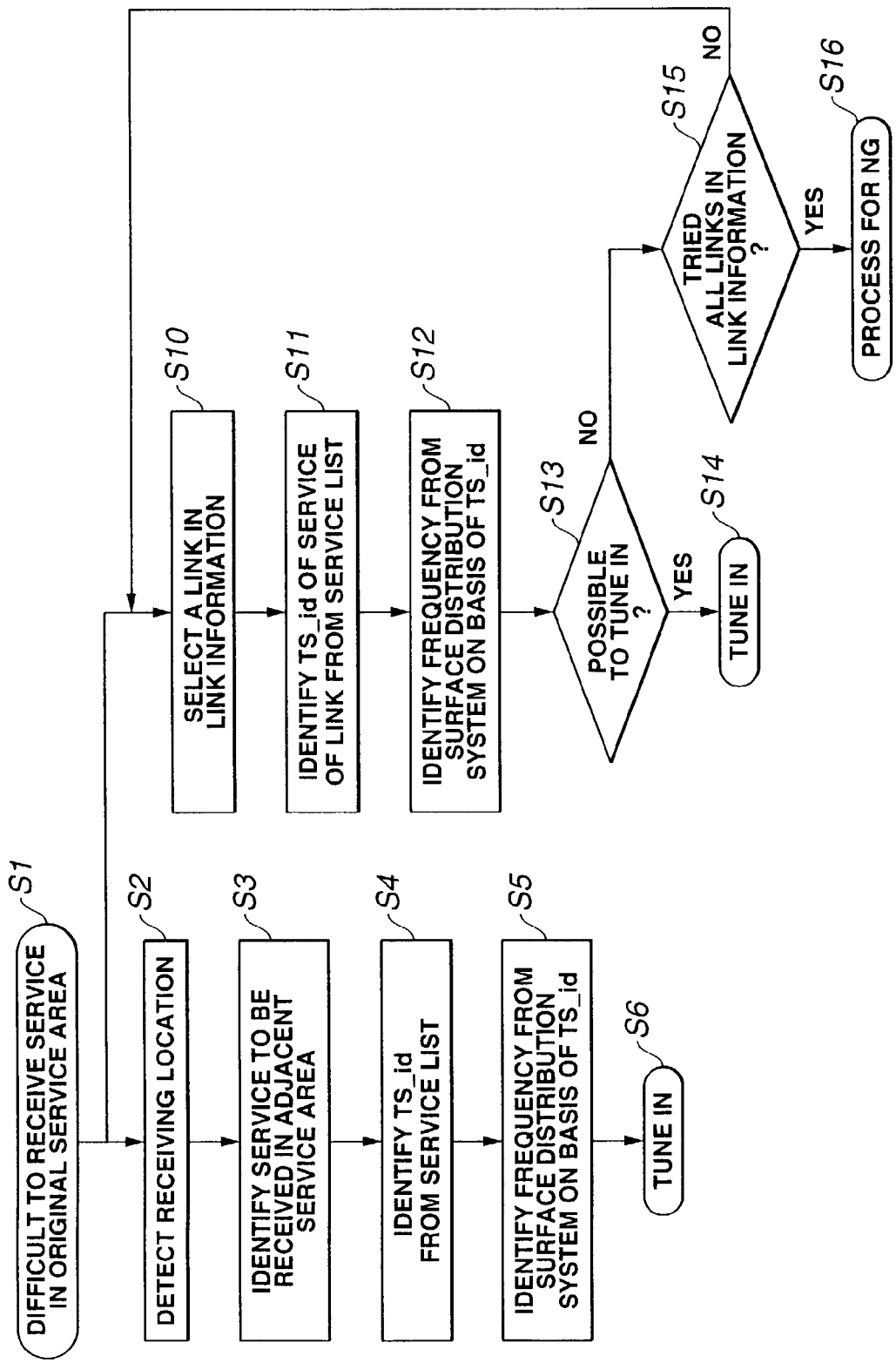
FIG. 11 is a flow chart of a typical operation of the receiver of FIG. 10.

Firstly, as the system controller 109 of the receiver 100 judges that the signal reception level of the output of the demodulating unit 101 goes under a predetermined value or the receiver 100 has moved out of the original service area on the basis of the current position detected by the GPS receiving unit 107, it determines that it is difficult for the receiver 100 to satisfactorily receive the transport stream it has been receiving in the original service area in Step S1 as shown in FIG. 11.

Then, the system controller 109 proceeds to Step S2, where the GPS receiving unit 107 detects the current position of the receiver 100.

Subsequently, the system controller 109 moves to Step S3, where it selects the adjacent service area that covers the current position and identifies the "service ID" of the link of the adjacent service area to be selected by referring to the link information stored in the memory 108.

Then, in Step S4, it identifies the "TS_id" that corresponds to the "service ID" identified in Step S3 by referring to the service list shown in FIG. 6.

Thereafter, in Step S5, it identifies the "frequency", the "mode", the "guard interval" and other pieces of information corresponding to the "TS_id" identified in Step S4.

Subsequently, in Step S6, the demodulating unit 101 tunes in to the program (service) of the selected link on the basis of the pieces of information identified in Step S5. As a result, the controller 109 completes the operation of switching to the program (service) being transmitted in the adjacent service area where it has moved in.

If the receiver 100 does not comprise a GPS receiving unit 107, it operates in a manner as described below to switch to a linked program (service).

Firstly, as the system controller 109 of the receiver 100 judges that the receiver 100 has moved out of the original service area because the signal reception level of the output of the demodulating unit 101 goes under a predetermined value or for some other reason, it determines that it is difficult for the receiver 100 to satisfactorily receive the transport stream it has been receiving in the original service area in Step S1 as shown in FIG. 11.

Then, the controller 109 proceeds to Step S10, where it selects a link out of a plurality of links contained in the link information stored in the memory 108 and identifies the "service ID" of the link.

Thereafter, in Step S11, the controller 109 identifies the "TS_id" corresponding to the "service ID" identified in Step S10 by referring to the service list as shown in FIG. 6.

Subsequently, in Step S12, it identifies the "frequency", the "mode", the "guard interval" and other pieces of information corresponding to the "TS_id" identified in Step S11 by referring to the terrestrial delivery system list as shown in FIG. 5.

Then, in Step S13, the controller 109 causes the demodulating unit 101 to tune in to the program (service) of the selected link on the basis of the pieces of information identified in Step S12 and judges if the receiver 100 can receive the program (service) of the selected link well or not. Thereafter, the controller 109 proceeds to Step S14 when it judges that the receiver 100 can receive the program (service) well, whereas it proceeds to Step S15 when it judges that the receiver 100 cannot receive the program (service) well.

In Step S14, the receiver 100 completes the operation of switching to the program (service) being transmitted in the adjacent service area where it has moved in.

When the controller 109 proceeds to Step S15, it determines if an attempt at tuning in to all the links contained in the link information has been made or not. If the attempt has not been completed, the controller 109 returns to Step S10 and selects another link to go on the tuning operation. If, on the other hand, the attempt at tuning in to all the links has been completed, the controller 109 proceeds to Step S16.

In Step S16, the controller 109 determines that it is difficult to receive any of the programs (services) of the links contained in the link information. Then, the receiver 100 either continues tuning in to the program (service) it has been receiving in the original service area or stops any reception. It may be so arranged that a message "no signal reception" is displayed on the display of the receiver 100 when the latter stops tuning. Alternatively or additionally, it may be so arranged that a voice message is sounded from the loudspeaker of the receiver 100 for the same effect.

As described above, when the receiver 100 is not provided with a GPS receiving unit 107, it has to judge to which of the links contained in the link information can successfully tune in by carrying out a search operation. Then, the receiver 100 is forced to temporarily stop producing an audio signal and/or a video signal.

Therefore, it may be so arranged that the receiver 100 comprises at least a pair of demodulating units 101s 101 and one of the demodulating section searches a link for optimally receiving a program (service), while the other demodulating section keeps on receiving the current program (service) of the original service area in order to minimize the interruption of signal output.

With this arrangement, the possible interruption of signal output can be minimized for a search operation.

Now, the operation of the controller 109 of a receiver 100 having the above described configuration that it switches to some other program (service) by allocating priorities to the links contained in the link information when the receiver 100 moves into an adjacent service area will be described below by referring to the flow chart of FIG. 12.

Figure 12:
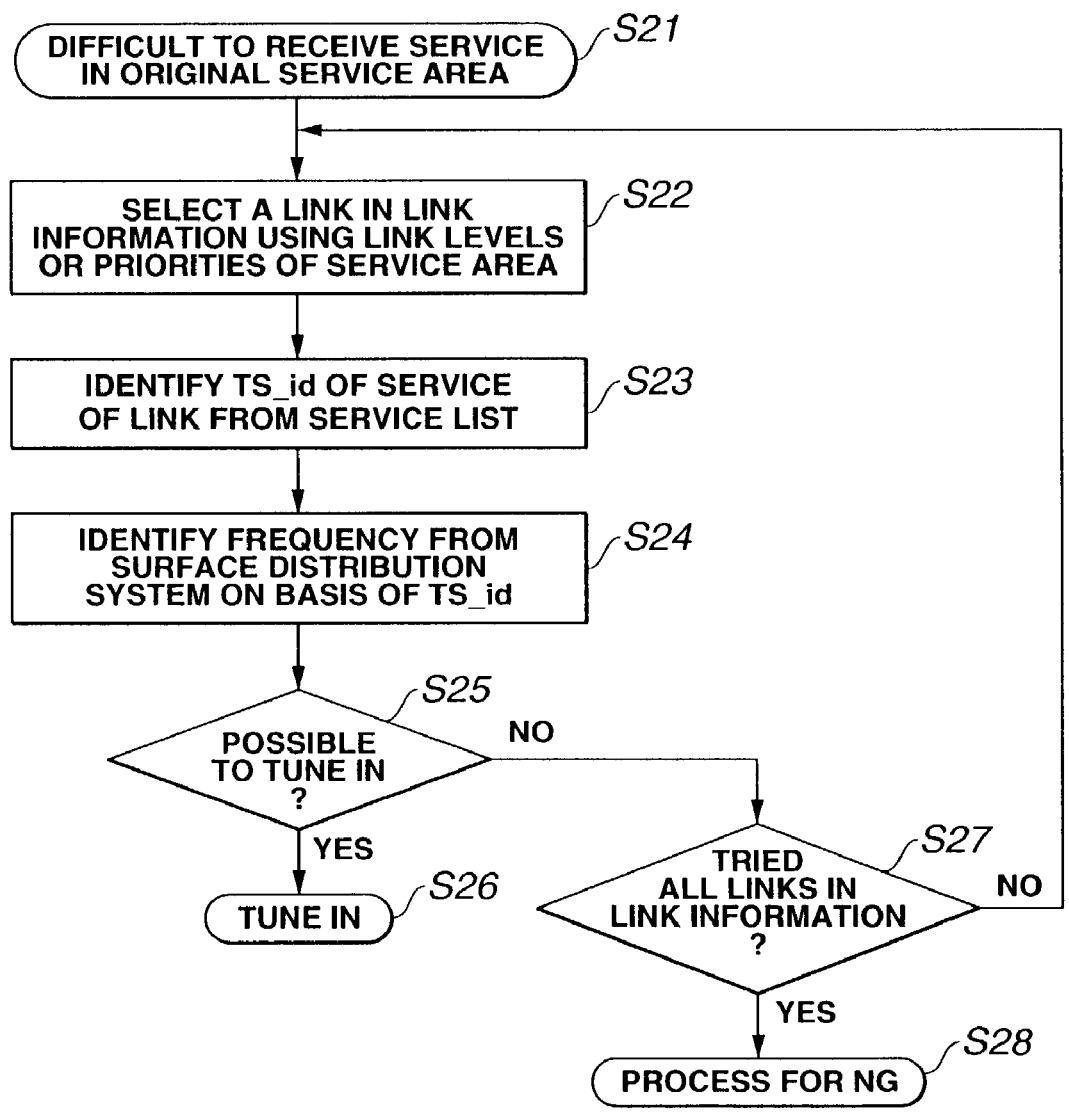
FIG. 12 is a flow chart of an operation of the receiver of FIG. 10 to be conducted when the receiver determines the priorities of various programs.

Firstly, as the system controller 109 of the receiver 100 judges that the receiver 100 has moved out of the original service area because the signal reception level of the output of the demodulating unit 101 goes under a predetermined value or for some other reason, it determines that it is difficult for the receiver 100 to satisfactorily receive the transport stream it has been receiving in the original service area in Step S21 as shown in FIG. 12.

Then, the controller 109 proceeds to Step S22, where it selects the link having the highest priority out of a plurality of links contained in the link information stored in the memory 108 and identifies the "service ID" of the link.

Thereafter, in Step S23, the controller 109 identifies the "TS_id" corresponding to the "service ID" identified in Step S22 by referring to the service list as shown in FIG. 6.

Subsequently, in Step S24, it identifies the "frequency", the "mode", the "guard interval" and other pieces of information corresponding to the "TS_id" identified in Step S23 by referring to the terrestrial delivery system list as shown in FIG. 5.

Then, in Step S25, the controller 109 causes the demodulating unit 101 to tune in to the program (service) of the selected link on the basis of the pieces of information identified in Step S24 and judges if the receiver 100 can receive the program (service) of the selected link well or not. Thereafter, the controller 109 proceeds to Step S26 when it judges that the receiver 100 can receive the program (service) well, whereas it proceeds to Step S27 when it judges that the receiver 100 cannot receive the program (service) well.

In Step S26, the controller 109 completes the operation of switching to the program (service) being transmitted in the adjacent service area where it has moved in.

When the controller 109 proceeds to Step S27, it determines if an attempt at tuning in to all the links contained in the link information has been made or not. If the attempt has not been completed, the controller 109 returns to Step S22 and selects the link having the second highest priority to go on the tuning operation. If, on the other hand, the attempt at tuning in to all the links has been completed, the controller 109 proceeds to Step S28.

In Step S28, the controller 109 determines that it is difficult to receive any of the programs (services) of the links contained in the link information. Then, the receiver 100 either continues tuning in to the program (service) it has been receiving in the original service area or stops any reception. It may be so arranged that a message "no signal reception" is displayed on the display of the receiver 100 when the latter stops tuning. Alternatively or additionally, it may be so arranged that a voice message is sounded from the loudspeaker of the receiver 100 for the same effect.

As described above, the receiver 100 is required to judge to which of the links contained in the link information it can successfully tune in by carrying out a search operation. Then, the receiver 100 is forced to temporarily stop producing an audio signal and/or a video signal.

However, the receiver 100 can select a program (service) which can receive in the service area the receiver 10 has moved into, with an enhanced level of probability by searching the links, referring to the link information and the priorities allocated to the links. Therefore, the interruption of the signal output for the search operation can be minimized and the optimal link can be searched efficiently.

It may be so arranged that the receiver 100 searches a link on the basis of the current location of itself as detected by the GPS receiving unit 107. Then, for example, if it is clearly known that the receiver 100 has moved out of the original service area 10a into the adjacent service area 20a as a result of the operation of the GPS receiving unit 107, the controller 109 searches the links in the service areas with service area IDs "area 20", staring from the link having the highest priority with service ID "service 5", by referring to the link information as shown in FIG. 8. With this arrangement, the time necessary for the search operation can be reduced further and the program (service) that can be received optimally can be reliably detected in the service area where the receiver 100 has moved in.

It may alternatively be so arranged that the receiver 100 does not automatically start a search operation, referring to the link information, but displays the links in the order of the priorities allocated to them. Then, the link to be tuned in may be selected according to the input operation at the input section.

INDUSTRIAL APPLICABILITY

As described above in detail, with a digital broadcasting system and a digital broadcasting method according to the invention, a transport stream, program or events being broadcast in a service area is made to contain link information showing the links of programs being transmitted in adjacent service areas so that, when a receiver moves from the original service area into an adjacent service area, it can receive a program being transmitted in the adjacent service area without cumbersome operations.

A digital broadcasting transmitter according to the invention can transmits a terrestrial broadcast containing link information showing the programs being transmitted in adjacent service areas that are linked to the transport stream, program or events being transmitted in the original service area by the link information providing means.

A digital broadcasting receiver according to the invention can receive a program being transmitted in the adjacent service area where it has moved in by referring to the link information extracted by its link information extracting means without cumbersome operations.

Thus, according to the present invention, when the receiver moves from the original service area into an adjacent service area, it can automatically receive a program in the adjacent service area relating to the transport stream, program or events being transmitted in the original service area when the broadcaster selects in advance programs in the adjacent service areas and links them to a specific transport stream, program or events. Additionally, if a plurality of affiliated broadcasters may broadcast a same event at a same time, the receiver can automatically receive the same event when it moves from the original service area into an adjacent service area.

Thus, it is now possible to freely and flexibly link the terrestrial broadcast being transmitted in a service area and the terrestrial broadcasts being transmitted in adjacent service areas. Additionally, as the receiver can keep on receiving a program if it moves from the original service area into an adjacent service area, it is now possible to prevent an audience or a listener receiving a program from stopping the reception or switching to a terrestrial broadcast being transmitted by some other broadcaster when the reception is temporarily interrupted.

The invention claimed is:

1. A digital broadcasting system, comprising:
   a transmitter that transmits a first transport stream in a first service area, the first transport stream including:
      links between first programs in the first transport stream in the first service area and second programs in one or more transport streams in a second service area, and
      priorities for the links; and
   a receiver that receives the first transport stream including the first programs, the links, and the priorities for the links from the transmitter, and automatically selects one of the second programs that corresponds to one of the first programs when the receiver moves from the first service area to the second service area, wherein the selecting includes:
      using the links to locate the selected second program in the one or more transport streams in the second service area when the links identify a match between one of the first programs and one of the second programs, and
      searching the second programs in order of the priorities, when the links do not identify the match;
   wherein the second service area is adjacent to the first service area, and one or more second programs in the second service area are different from one or more first programs in the first service area.

2. The system of claim 1, wherein the transmitter describes the links and the priorities using a link descriptor in at least one of a network information table, a service description table, and an event information table.

3. The system of claim 2, wherein the transmitter identifies the priority of each link in a linkage_type field or in a private_data_byte field in the link descriptor.

4. A digital broadcasting transmitter, comprising:
   a multiplexer unit; and
   a system controller, wherein the multiplexer unit and the system controller provide a first transport stream in a first service area, the first transport stream including:
      links between first programs in the first transport stream in the first service area and second programs in one or more transport streams in a second service area, and
      priorities for the links, wherein the links allow locating one of the second programs that corresponds to one of the first programs, and
      the priorities provide an order for searching the links to identify one of the second programs that corresponds to one of the first programs;
   wherein the second service area is adjacent to the first service area, and one or more second programs in the second service area are different from one or more first programs in the first service area.

5. The digital broadcasting transmitter of claim 4, wherein the multiplexer unit and the system controller include the links and the priorities in a network information table in the first transport stream.

6. The digital broadcasting transmitter of claim 4, wherein the multiplexer unit and the system controller include the links and the priorities in a service description table in the first transport stream.

7. The digital broadcasting transmitter of claim 4, wherein the multiplexer unit and the system controller include the links and the priorities in an event information table in the first transport stream.

8. The digital broadcasting transmitter of claim 4, wherein the multiplexer unit and the system controller rank the links based on the priorities.

9. The digital broadcasting transmitter of claim 4, wherein the multiplexer unit and the system controller include the links and the priorities in a link descriptor in at least one of a network information table, a service description table, and an event information table.

10. The digital broadcasting transmitter of claim 9, wherein the multiplexer unit and the system controller identify the priority of each link in a linkage_type field or in a private_data_byte field in the link descriptor.

11. A digital broadcasting receiver, comprising:
receiving means for receiving, from a transmitter, a first transport stream including first programs in a first service area, links between the first programs in the first transport stream and second programs in one or more transport streams in a second service area, and priorities for the links; and
selection means for automatically selecting one of the second programs that corresponds to one of the first programs when the receiver moves from the first service area to the second service area, wherein the selection means includes means for:
searching the second programs in order according to the priority based on the links;
using the links to locate the selected second program in the one or more transport streams in the second service area when the links identify a match between one of the first programs and one of the second programs, and
searching the second programs in order of the priorities, when the links do not identify the match;
wherein the second service area is adjacent to the first service area, and one or more second programs in the second service area are different from one or more first programs in the first service area.

12. The digital broadcasting receiver of claim 11, further comprising:
detection means for detecting a location of the receiver, wherein the selection means selects the one of the second programs based on the location.

13. The digital broadcasting receiver of claim 12, wherein the detection means detects the location using a global positioning system.

14. The digital broadcasting receiver of claim 12, wherein the detection means:
receives input of location information; and
determines the location using the location information.

15. The digital broadcasting receiver of claim 11, comprising:
first receiver means for receiving the first transport stream; and
second receiver means for searching, using the selection means, for the one of the second programs.

16. The digital broadcasting receiver of claim 11, wherein the selection means searches the links in order of the priorities.

17. A digital broadcasting receiver, comprising:
receiving means for receiving, from a transmitter, a first transport stream including first programs in a first service area, and links between the first programs in the first transport stream and second programs in one or more transport streams in a second service area; and
selection means for determining priorities for the links and for automatically selecting one of the second programs that corresponds to one of the first programs when the receiver moves from the first service area to the second service area, wherein the selection means includes means for:
searching the second programs in order of the priorities based on the links;
using the links to locate the selected second program in the one or more transport streams in the second service area when the links identify a match between one of the first programs and one of the second programs, and
searching the second programs in order of the priorities, when the links do not identify the match;
wherein the second service area is one of adjacent service areas to the first service area, and one or more second programs in the second service area are different from one or more first programs in the first service area.

18. The digital broadcasting receiver of claim 17, wherein the selection means determines the priorities using a history of moving the receiver among the adjacent service areas.

19. The digital broadcasting receiver of claim 17, wherein the selection means determines the priorities using a predefined ranking of the adjacent service areas.

20. The digital broadcasting receiver of claim 17, wherein the selection means determines the priorities using the number of links for each adjacent service area.

21. A method comprising:
receiving at a receiver, from a transmitter, a first transport stream including first programs in a first service area, a link descriptor providing links between the first programs in the first transport stream and second programs offered in second transport streams in a second service area, and priorities for the links, each priority indicating an order for replacing the first transport stream with each second transport stream; and
automatically selecting one of the second programs that corresponds to one of the first programs when the receiver moves from the first service area to the second service area, wherein the selecting includes:
searching the second programs according to the priority for the links;
using the links to locate the selected second program in the one or more transport streams in the second service area when the links identify a match between one of the first programs and one of the second programs, and
searching the second programs in order of the priorities, when the links do not identify the match;
wherein the second service area is adjacent to the first service area, and one or more second programs in the second service area are different from one or more first programs in the first service area.

* * * * *